Patented Dec. 10, 1929

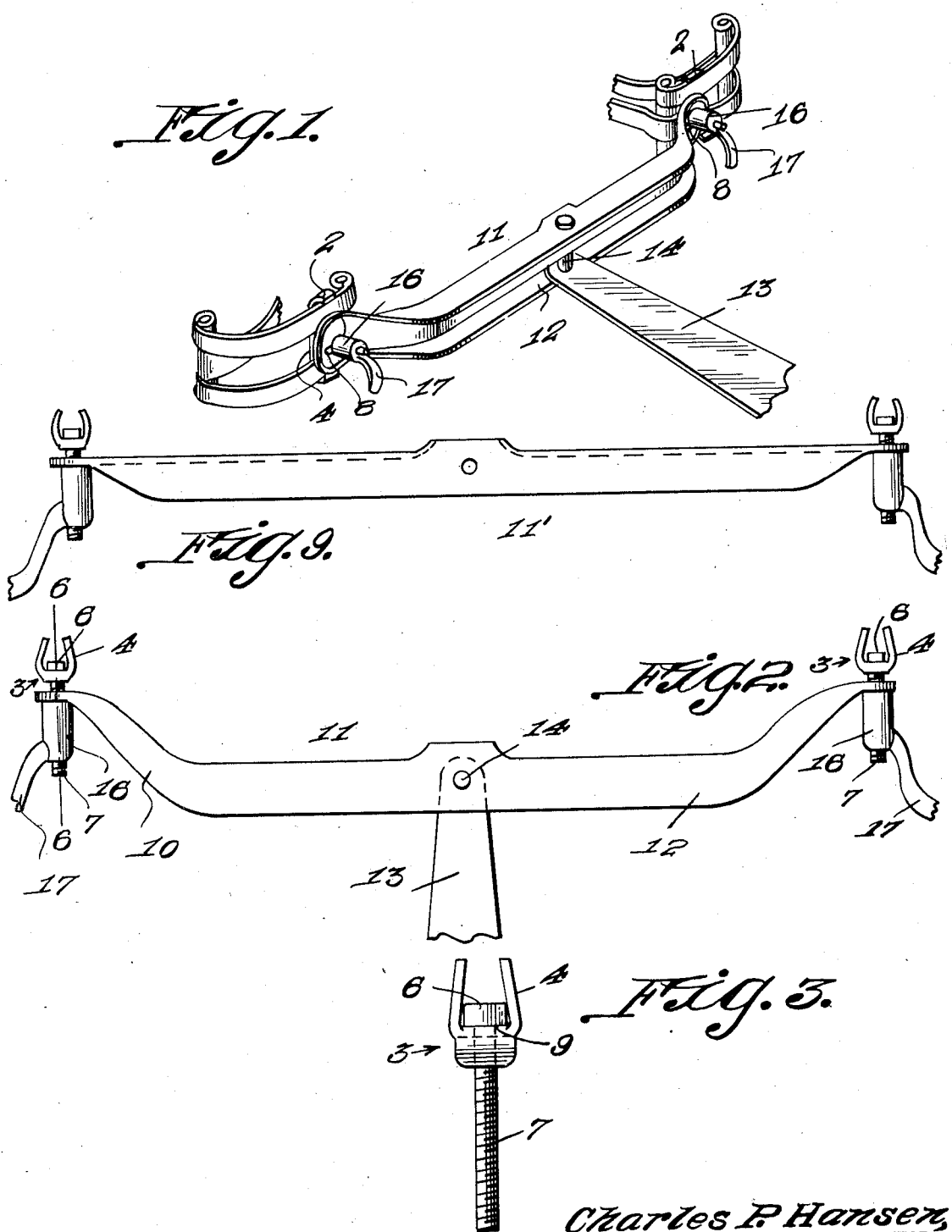

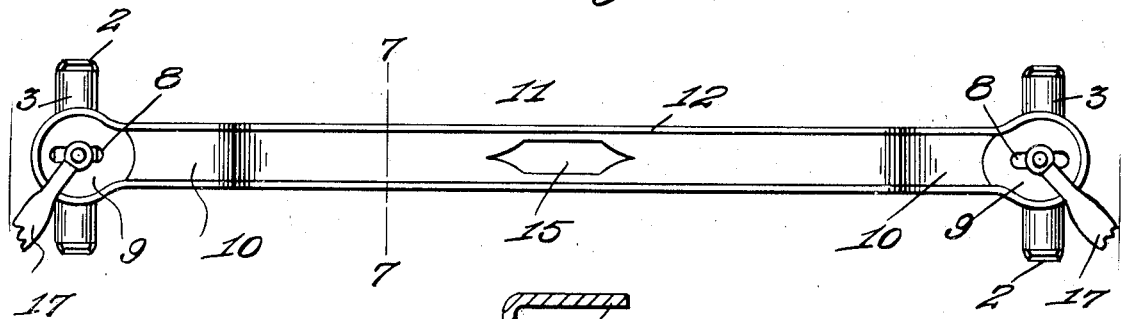
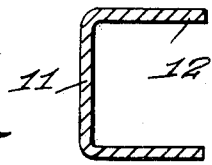
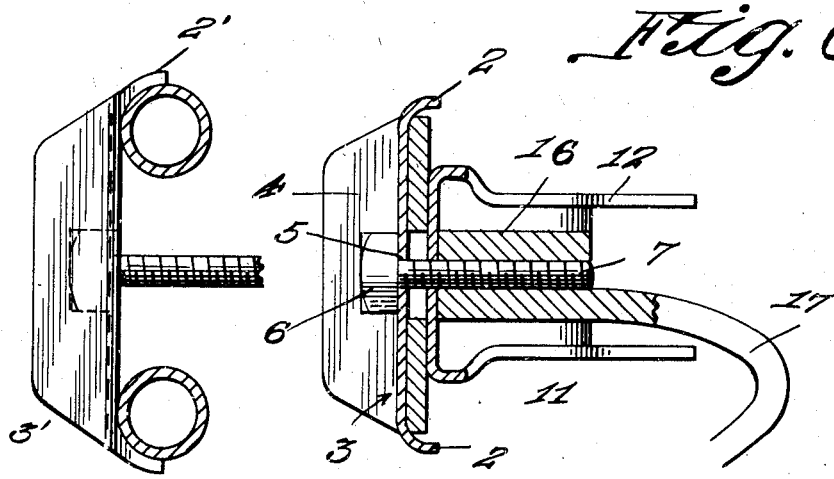
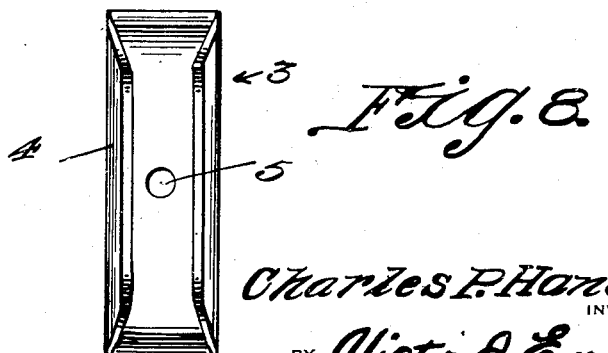

1,739,456

UNITED STATES PATENT OFFICE

CHARLES P. HANSEN, OF EVAN, MINNESOTA, ASSIGNOR OF ONE-HALF TO DELL HANSEN, OF EVAN, MINNESOTA

AUTOMOBILE TRAILER-HITCH ATTACHMENT

Application filed February 20, 1929. Serial No. 341,484.

My present invention has reference to a trailer hitch for automobiles and has for its primary object the provision of a means for this purpose which can be easily and quickly secured to and as readily removed from the rear fender guards or bumpers of the automobile.

A further object is the provision of a device for this purpose which while light, is of a strong and rigid construction, easily and quickly applied to the rear fender guards or bumper of an automobile and sustained thereon in a strong and effective manner and further wherein the application of the improvement does not interfere with the spare tire or the trunk on the rear of the machine.

To the attainment of the foregoing and many other objects which will present themselves as the nature of the invention is better understood, the invention further resides in certain other novel features of construction, combination and operative association of parts, one satisfactory embodiment of which is disclosed by the accompanying drawings.

In the drawings:

Figure 1 is a perspective view of the improvement in applied position.

Figure 2 is a plan view of the improvement per se.

Figure 3 is an elevation of one of the clips and one of the securing bolts which is carried by the clips.

Figure 4 is a front elevation of the improvement.

Figure 5 is an elevation of one of the clips having its ends shaped to receive the round bars of the rear fender guards or bumpers.

Figure 6 is an enlarged sectional view approximately on the line 6—6 of Figure 2.

Figure 7 is a transverse sectional view on the line 7—7 of Figure 4.

Figure 8 is a rear elevation of one of the clips.

Figure 9 is a plan view showing the main member of the hitch straight.

In the showing of the drawings I have illustrated in Figure 1 my improvement attached to rear fender guards or bumpers of an automobile but obviously the same may be attached to the type of bumpers which extend entirely across the automobile. The fender guards or bumpers comprise the usual spaced arched spring plates which are connected in the usual manner to the rear of the machine (not shown). The edges of the arched plates of the bumpers or fender guards are engaged by lips 2 formed on the ends of clips 3. When the bumper is constructed of tubes as disclosed by Figure 5 of the drawings the lips 2' of the clips 3' are rounded so that the said lips describe approximately one-fourth of a circle but when the lips are engaged with the straight plates of the bumper disclosed by Figure 1 of the drawings, the lips are arranged angularly with respect to the body of the clips. The edges of each of the clips 3 are formed with inwardly inclined flanges 4, respectively, and each of the clips is centrally provided with a bolt opening 5. There is arranged between the flanges for contacting engagement therewith the heads 6 of bolts 7 which pass through the openings 5, and these bolts also pass through longitudinally arranged elongated openings 8 on the straight extensions 9 at the angle ends 10 of the main member 11 of the improvement. The element 11 is in the nature of a channeled member and the flanges 12 at the center thereof are designed to receive therebetween the end of a trailer pole 13.

A removable pivot 14 passes through the flanges 12 and through an opening in the trailer pole. Suitable means is, of course, provided for holding the trailer pole in the channeled member. The channeled member has its rear face provided with an opening 15 disposed opposite the pivot 14, and the rear of the channeled member may be flanged around said opening. This opening permits of the free swinging of the trailer pin, or in other words, prevents the frictional contact of the pivoted end of the trailer pole with the inner wall of the channeled member 11.

There is screwed on the bolts 7 nuts in the nature of elongated sleeves 16, each of said sleeves having on its outer end an angularly arranged weighted handle 17 and this handle when swung beyond the horizontal has a tendency to turn the nut 16 in a homeward direction and thereby prevent the accidental removal of the nuts from the bolts. The handles are, of course, of a length sufficient to permit the free turning thereof without contacting with the angle ends 10 of the channeled member.

From experience I have found that my improvement may be readily attached to or removed from the rear fender guards or bumpers of an automobile in a short length of time, only a few minutes being required. The trailer pole 13 is, of course, attached to any ordinary type of trailers. The channeled member 11, which is substantially arched in plan provides a space between the ends and the center thereof so that the same does not interfere with the arrangement of the spare tire or the trunk on the rear of the automobile and the simplicity of my invention will be readily apparent.

By providing the longitudinal openings in the extremities of the channeled member, the device may be readily applied to bumpers or rear wheel fender guards of different lengths.

If desired I may make the main member 11' of the hitch straight instead of having angle ends, as in the construction heretofore described and, therefore, it is within the province of this invention to form the said member as straight as disclosed by Figure 9. This construction will be employed in instances where the spare tire does not interfere with a straight channeled member.

Having described the invention, I claim:

A trailer hitch designed to be attached to the rear fender guards or bumpers of an automobile, comprising a channeled member having angle ends which merge into straight outwardly directed portions that are centrally slotted longitudinally, clips designed for engagement with the inner faces of the bumper and having lips for contacting with the opposite edges of the bumper, said clips having inwardly directed angle edge flanges, a bolt passing centrally through the clips and having its head contacted by the flanges, said bolt passing between the bars of the fender and through the slots of the channeled member, nuts having tubular bodies which are screwed on the bolts and which contact with the straight end portions of the channeled member, a weighted handle on each bolt, said channeled member at its center having its rear face provided with an opening and its horizontal flanges provided with alining apertures, said channeled member designed to receive therein the end of a trailer pole which is disposed opposite the opening and a pivot pin passing through the apertures and through the trailer pole.

In testimony whereof I affix my signature.

CHARLES P. HANSEN.